United States Patent [19]
McNamara et al.

[11] Patent Number: 5,218,988
[45] Date of Patent: Jun. 15, 1993

[54] LIQUID FEED SYSTEM

[75] Inventors: Clifford F. McNamara, Capitola; James W. Livingston, Santa Cruz, both of Calif.

[73] Assignee: Beta Technology, Inc., Santa Cruz, Calif.

[21] Appl. No.: 765,535

[22] Filed: Sep. 25, 1991

[51] Int. Cl.$^5$ .................................... G05D 11/02
[52] U.S. Cl. ................... 137/101.21; 137/895
[58] Field of Search .............. 137/98, 99, 101.21, 137/888, 895

[56] References Cited

U.S. PATENT DOCUMENTS

| | | | |
|---|---|---|---|
| 2,592,884 | 4/1952 | Fox et al. | 137/895 X |
| 2,863,471 | 12/1958 | Thurman | 137/101.21 |
| 3,455,321 | 7/1969 | Flynn | 137/101.21 |
| 3,520,448 | 7/1970 | Russell | 137/98 UX |
| 4,006,752 | 2/1977 | DeVale | 137/101.21 |
| 4,324,294 | 4/1982 | McLoughlin et al. | 137/101.21 X |
| 4,722,363 | 2/1988 | Allyn | 137/599.1 |
| 4,955,507 | 9/1990 | Kirschner et al. | 137/100 X |

Primary Examiner—Stephen M. Hepperle
Attorney, Agent, or Firm—Flehr, Hohbach, Test, Albritton & Herbert

[57] ABSTRACT

A system for controllably metering a first liquid with a second liquid includes a venturi injector unit and a peristaltic pump. A source of pressurized first liquid is coupled to the input port on the venturi injector unit, while the peristaltic pump couples metered amounts of the second liquid to the injection port on the venturi injector unit. The throughflow of the first liquid within the venturi injector unit creates a reduced pressure that draws in the metered amounts of the second liquid provided at the injection port. The desired mixture of the first and second liquids is provided at the output port of the venturi unit. In addition to providing a metered output mixture, the use of a peristaltic pump further allows the second liquid to include a chemical that might degrade the performance of a conventional pump. The preferred embodiment discloses a dishwashing system wherein the first liquid is water and the second liquid is a chemical such as a detergent or a wetting agent. A pressure regulator is placed in series between the source of the first liquid and the input port of the venturi injector unit to ensure the required pressure differential across the venturi injector unit to produce the reduced pressure at the injector port.

4 Claims, 1 Drawing Sheet

LIQUID FEED SYSTEM

This invention relates to systems for combining liquids, and more particularly to fluid metering systems for accurately combining a first liquid with a second liquid containing a chemical.

BACKGROUND OF THE INVENTION

It is known in the art to combine two liquids using a venturi injector unit. A source of pressurized liquid is coupled to the input port of the venturi injector unit. This liquid creates a reduced pressure within the venturi chamber as it flows through the unit and exits via the venturi injector unit output port. If a source of second liquid is coupled to the venturi chamber, it will be drawn into the chamber by the reduced pressure. The result is that a mixture of the first and second liquids will be delivered at the venturi injector unit output port. Such a system is disclosed in U.S. Pat. No. 3,598,288 to Pomgate.

Although such a venturi injector unit system is straightforward and economical, it does not provide constant metering, i.e., the ratio of the liquids in the output mixture is not constant. The ratio varies, for example, with fluctuations in the throughflow rate of the first liquid, and with fluctuations in the back pressure at the output port of the venturi injector unit. These ratio variations can be somewhat minimized by providing a high pressure pump to transport the first liquid, and a lower pressure pump to transport the second liquid. Such an approach is disclosed in U.S. Pat. No. 4,217,924 to Finger. Although his system is undoubtedly an improvement, the conventional pumps used by Finger does not necessarily provide a constantly metered output mixture.

The problem of providing a controllably metered output mixture is compounded if the second liquid is a chemical because conventional pumps are subject to chemical attack. As the chemical causes deterioration of pump gears, pistons, diaphragms, and the like, the flow characteristics of the pump change, varying the output mixture ratio. What is required is an inexpensive system that can accurately meter a mixture that includes a liquid chemical.

SUMMARY OF THE INVENTION

It is an objective of the present system to provide a system for delivering a metered mixture of two liquids to a system that requires an input pressure in excess of 20 psi, where the second liquid includes a chemical.

It is a further objective to provide such a delivery system using inexpensive but durable components, suitable for long term use in an environment such as a dishwasher.

These objectives are met by providing a delivery system with a venturi injector unit and a peristaltic pump. The venturi injector unit has an input port that is coupled to a pressurized source of the first liquid, an injection port that draws in a source of the second liquid, and an output port that delivers a metered mixture of the two liquids. The injection port is coupled to the venturi chamber within the venturi injector unit, a region wherein a reduced pressure is created by the throughflow of the first liquid.

The peristaltic pump has an input coupled to a source of the second liquid, and an output coupled to the injection port of the venturi injector unit. The peristaltic pump accurately meters the amount of the second liquid coupled to the venturi injector unit. This metered amount of the second liquid is pumped into the venturi chamber by the peristaltic pump, where it combines with the first liquid. The results is an accurate mixture ratio of the two liquids flowing from the output port of the venturi injector unit.

The present invention is especially suitable for delivering metered amounts of a liquid chemical. In a peristaltic pump, in contrast to conventional pumps, the second liquid only contacts a flexible tube that is externally constricted in a peristaltic fashion to move the liquid within. Since this tube can be made from a chemically resistant material, e.g., a plastic, the second liquid may contain chemicals without degrading the metering accuracy of the system.

The present invention optionally includes a pressure regulator to regulate the pressure differential across the venturi injector unit for increased mixture ratio accuracy.

Other features and advantages of the invention will appear from the following description in which the preferred embodiment has been set forth in detail in conjunction with the accompanying drawings.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENT

Figure 1:
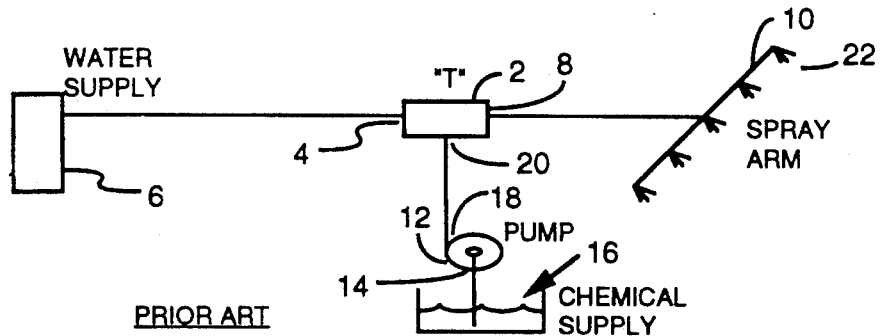
FIG. 1 is a schematic representation of a prior art system for combining two liquids.

FIG. 1 shows a prior art system comprising a "T" coupler 2 whose input port 4 is coupled to a source of pressurized first liquid 6, and whose output port 8 is coupled to a spray arm 10. This system includes a conventional pump 12 whose input 14 is coupled to a source of a second liquid 16, and whose output 18 is coupled to a second input port 20 on the "T" coupler 2. Conventional pump 12 typically is a diaphragm pump, a piston and cylinder pump, a gear pump, a centrifugal pump or the like. Such conventional pumps 12 are often expensive and must be able to accurately meter as well as inject against the back pressure of the first fluid.

The spray arm 10 creates a back pressure at the "T" coupler output port 8 that must be overcome by the pressure of the first and second liquids at the "T" coupler input ports 4, 20. When this back pressure is overcome, a mixture of the liquids 6, 16 is delivered to the arm 10 from which it issues as several sprays 22. Unfortunately the ratio of the first and second liquids 6, 16 in the sprays 22 is not readily controlled. Among conventional pumps 12, only a diaphragm pump can provide good metering. However diaphragm pumps are expensive and are susceptible to corrosion and performance change if the second liquid includes a corrosive chemical. Further, pressure changes in the first liquid 6, and back pressure changes created by the spray arm 10 can also affect the ratio of the mixture delivered from the output port 8.

In FIG. 1, if the mixture delivered to the spray arm 10 flows at between 20 to 50 psi with a throughflow rate set to a value in the range of about 800 to 1800 ml/minute, a typical diaphragm pump 12 can provide the second liquid 16 at a flow within the range of about 2 to 30 ml/minute with an error of about ±2%. However if the throughflow rate is allowed to vary between the minimum and maximum flow rate (e.g., to change from about 800 to about 1800 ml/minute), the error in delivery of the second liquid increases to about ±5%.

Figure 2:
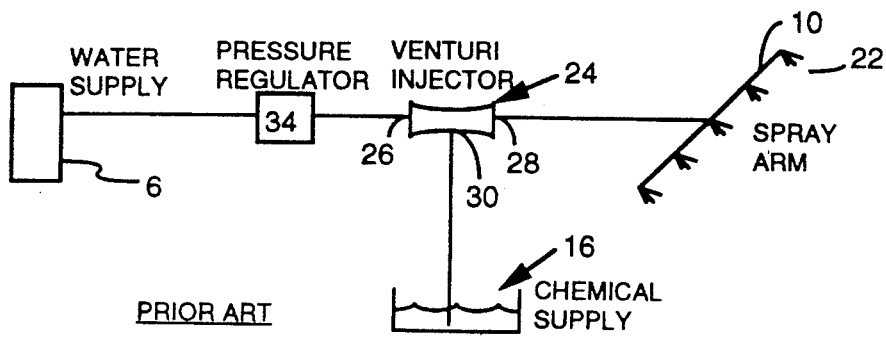
FIG. 2 is a schematic representation of a second prior art system for combining two liquids.

In the prior art system of FIG. 2, a venturi injector unit 24 is used in place of the "T" connector 2 and pump 14 shown in FIG. 1. The venturi injector unit 24 has an input port 26 coupled to a pressurized source of the first liquid 6, and an output port 28 coupled to the spray arm 10. As the first liquid 6 flows through the venturi injector unit 24, it creates a reduced pressure within the venturi chamber (not shown). An injection port 30 is coupled to this chamber and to a source of the second liquid 16. The second liquid 16 is drawn into the injection port 30 by the reduced pressure and becomes mixed with the first liquid 6 within the venturi injector unit 24. Again, assuming the back resistance of the spray arm 10 is overcome, a mixture of the two liquids 6, 16 will appear in the sprays 22.

While the use of a chemically resistant venturi injector unit 24 will enable the prior art system of FIG. 2 to mix the first liquid 6 with a second liquid 16 that includes a chemical, the ratio of the resultant mixture will not be constant. Variations in the pressure of the first liquid 6, and in the back pressure created by the spray arm 10 will affect the ratio of first and second liquids 6, 16 in the liquid mixture present at the output port 28.

In FIG. 2, if the mixture delivered to the spray arm 10 flows at between 20 to 50 psi with a throughflow rate set to a value in the range of about 800 to 1800 ml/minute, a typical venturi injector unit 24 can draw in the second liquid 16 at a flow within the range of about 2 to 30 ml/minute with an error of about ±2%. An optional pressure regulator 34 can be used for pressure control to ensure the proper pressure drop across the venturi 24. However if the throughflow rate is allowed to vary between the minimum and maximum flow rate, the error in delivery of the second liquid increases substantially to about ±50%.

Figure 3:
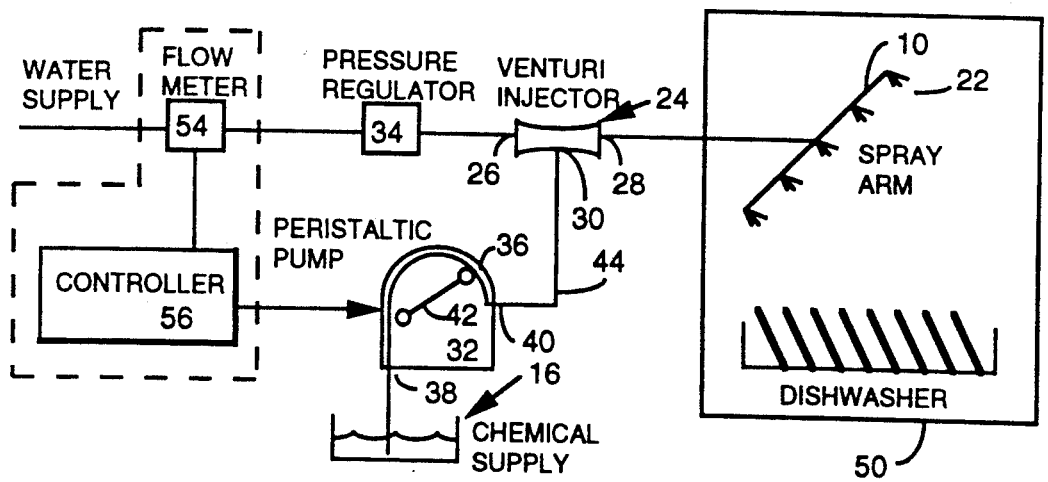
FIG. 3 is a schematic representation of the preferred embodiment of the present invention.

FIG. 3 shows the preferred embodiment of the present invention as including a venturi injector unit 24 (such as was described above), a peristaltic pump 32 and a pressure regulator 34. Peristaltic pumps such as pump 32 are known in the art and will not be described in great detail. Briefly, they include a flexible tube 36 having an input port 38 at one end and an output port 40 at the other end. A moving member 42 rhythmically constricts the outside of the tube 36 in a peristaltic fashion, pumping any liquid within the tube 36 in a direction from the input port 38 to the output port 40. Peristaltic pumps are characterized by very high metering accuracy, e.g., the ability to pump a liquid at a precise rate. However, peristaltic pumps typically cannot pump a liquid when the back pressure at the output port 40 exceeds about 25 psi. Peristaltic pumps are relatively maintenance free and economical, and typically cost about 20% of what a diaphragm pump costs.

The input port 38 of the peristaltic pump 32 is coupled to a source of the second liquid 16. Since the tube 36 may be a chemically resistant material, plastic for example, the second liquid 16 may include one or more chemicals. The peristaltic pump output port 40 is coupled via tubing 44 to the injection port 30 of the venturi injector unit 24. Since the pressure within tubing 44 can be lower than 25 psi, due to the venturi action, even though the pressure at ports 26 and 28 are higher than 25 psi, the peristaltic pump 32 can operate effectively.

A pressure regulator 34 is optionally included in the preferred embodiment to permit adjustment of the pressure differential between the input and output ports 26, 28 on the venturi injector. Regulator 34 is placed in series between the source of the first liquid 6 and the input port 26 of the venturi injector unit 24. In practice, the pressure regulator 34 is adjusted to ensure that the first liquid 6 flows through the venturi injector unit 24 at a rate sufficient to create adequate venturi action to maintain a pressure at port 30 less than 25 psi, and to overcome the back resistance at the output port 28 of the venturi injector unit 24.

In the preferred embodiment, the system of FIG. 3 is used with a dishwasher 50. The first liquid 6 is pressurized water, typically available at a pressure of about 20 psi to about 70 psi. The second liquid 16 is a chemical such as liquid detergent, a liquid wetting agent to prevent water spots on dishware, or the like. The pressure regulator 34 is a commercially available unit such as a model 10-125 manufactured by Watts. Regulator 34 has an adjustable output and is preferably set to deliver pressurized water into the input port 25 of the venturi injector unit 24 at about 50 psi. Other pressure regulators may of course be used.

Preferably the venturi injector unit 24 is a commercially available unit such as a model 200-3C manufactured by Dema Engineering Co., and is used with the #4 nozzle provided with model 200-3C. This venturi injector unit 24 receives pressurized water at the input port 26 preferably at about 50 psi and with a flow rate preferably at about 800 ml/minute, although other pressures and flow rates are permissible. The venturi injector unit 24 develops a reduced pressure such that the pressure at the injection port 30 is about 20 psi or less. It is of course important that the pressure at the injection port 30 not exceed the permissible back pressure at the output port 40 for the peristaltic pump 32 used. The pressure on the output port 28 of the venturi injector unit 24 is typically about 40 psi, with a throughflow rate of about 800 ml/minute. This output port pressure is sufficient to overcome the back resistance of the spray arm 10, used to spray the water-chemical mixture onto the dishware within the dishwasher. Other venturi injector units may of course be used.

The peristaltic pump 32 may be a commercially available unit such as model P4000 manufactured by Beta Technology Inc. This model can meter the liquid chemical 16 with an error that does not exceed about ±1%, at pressures at the peristaltic pump output 40 of 20 psi and below. As long as the back pressure at the output port 40 does not exceed the maximum permissible pressure for the pump 32 (e.g., 18 psi for this model pump), the second liquid 16 will continue to be metered within the same ±1% tolerance. The tube 44 coupling the peristaltic pump output port 40 and the injection port 30 of the venturi injector unit 24 is preferably flexible plastic having a diameter commensurate with the particular pump 32 being used, and a length determined by the particular physical installation in which the pump system is being used. It is to be understood that other peristaltic pumps may be used.

In practice, the system of FIG. 3 can deliver a metered amount of liquid chemical 16 to the spray arm 10 within a tolerance of about ±1%, despite variations in the pressurized water 6 throughflow of from about 800 to about 1800 ml/minute. This accuracy tolerance is about fifty times better than what can be achieved under in the same environment with a venturi injector unit 24 used alone, and about five times better than what can be achieved with a pump 12 such as a diaphragm pump used alone. As long as the throughflow in the venturi injector unit 24 is sufficient to allow a pressure at the venturi injection port 30 or less than about 20 psi, the peristaltic pump 32 will continue to provide an output, metered with an error of about ±1%, that is typically set to a value within the range of about 2-30 ml/minute.

In a commercial application, the cost of the liquid chemical 16 can be relatively high, such that it is important to accurately meter a predetermined minimum amount of the chemical 16. The peristaltic pump 32 ensures that a known quantity of liquid 16 is delivered into the venturi injector unit 24. As a result, fluctuations in the back pressure created by the spray arm 10, and fluctuations in the throughflow rate do not substantially affect the metering accuracy of the present invention.

The embodiment of FIG. 3 optionally includes a flow meter 54 and a controller 56. The flow meter 54 measures the throughflow of the first liquid supply 6, e.g. in ml/minute, and provides this data to controller 56. Controller 56 in turn regulates the metering rate of the peristaltic pump 36 according to the throughflow data provided by the flow meter 54. Controller 56 can coordinate the quantity of second liquid 16 provided by the peristaltic pump 32 as a function of throughflow. The quantity of second liquid 16 provided can be set, for example, N milliliters for each operational cycle of the dishwasher 50, or for each unit volume of first liquid 6 delivered to the dishwasher 50 (e.g., to create a 1:100 solution).

While the preferred embodiment has been described with reference to a dishwashing system, it is understood that the present invention may be used to accurately meter a mixture of liquids in other environments as well. Further, a venturi injector unit 24 having multiple injection ports 30 could be combined with peristaltic pumps 32 and multiple sources of liquids 16 to produce a metered mixture of several liquids, each containing a chemical.

Modifications and variations may be made to the disclosed embodiment without departing from the subject and spirit of the invention as defined by the following claims.

What is claimed is:

1. In a dishwasher, a system for controllably providing metered amounts of a liquid chemical, mixed with water during each operational cycle of the dishwasher, the system comprising:

a venturi injector unit coupling a source of pressurized water to an output port coupled to the dishwasher, said venturi injector unit further including an injection port introducing the liquid chemical into said pressurized water flowing through said venturi injector unit; and a peristaltic pump coupling a supply of said liquid chemical to said injection port on said venturi injector unit; and a controller, coupled to said peristaltic pump, that activates said peristaltic pump so as to deliver a predefined amount of said liquid chemical to said injection port of said venturi injector unit during each operational cycle of said system;

wherein the predefined amount of said liquid chemical delivered to said injection port during each operation cycle is fixed without regard to said first liquid's flowrate through said venturi injector unit.

2. The system of claim 1, wherein said mixture is metered within a range accurate to within about ±1%.

3. The system of claim 1 further including pressure regulating means for providing said pressurized water at a predetermined pressure to said venturi injector unit.

4. The system of claim 1, wherein said liquid chemical includes a detergent, a wetting agent, or a combination thereof.

* * * * *